United States Patent [19]

Suzuki et al.

[11] Patent Number: 5,298,795
[45] Date of Patent: Mar. 29, 1994

[54] CURRENT CONSUMPTION CONTROL DEVICE

[75] Inventors: Atsuhiko Suzuki, San Jose, Calif.; Teruhisa Inoue; Kyosuke Hashimoto, both of Hiratsuka, Japan; Osamu Michihira; Seiji Hirano, both of Hiroshima, Japan

[73] Assignees: The Furukawa Electric Co., Ltd., Tokyo; Mazda Motor Corp., Hiroshima, both of Japan

[21] Appl. No.: 27,569

[22] Filed: Mar. 5, 1993

Related U.S. Application Data

[63] Continuation of Ser. No. 738,037, Jul. 30, 1991, abandoned.

[30] Foreign Application Priority Data

Aug. 6, 1990 [JP] Japan .................. 2-208349

[51] Int. Cl.⁵ .............................................. G06F 1/32
[52] U.S. Cl. ...................................... 307/116; 307/39; 364/707
[58] Field of Search ................ 379/61; 307/10.7, 10.1, 307/38–40, 116, 130; 364/707; 455/343, 127, 38.3; 375/36; 340/825.06, 825.18, 333

[56] References Cited

U.S. PATENT DOCUMENTS

| | | | |
|---|---|---|---|
| 4,419,765 | 12/1983 | Wycoff et al. ................ | 455/36 |
| 4,631,737 | 12/1986 | Davis et al. ................... | 375/88 |
| 4,780,620 | 10/1988 | Hogberg et al. ............... | 307/10.1 |
| 4,903,335 | 2/1990 | Shimuzu ........................ | 455/343 |
| 4,987,317 | 1/1991 | Pournain et al. .............. | 307/40 |
| 5,196,728 | 3/1993 | Jaux ............................... | 303/10.1 |

*Primary Examiner*—A. D. Pellinen
*Assistant Examiner*—Richard T. Elms
*Attorney, Agent, or Firm*—Frishauf, Holtz, Goodman & Woodward

[57] ABSTRACT

A device for controlling the current consumption of a power supply which applies a voltage to a transmission control circuit for transmitting a transmission signal with respect to a transmission line is provided. A power supply stabilizing circuit for stabilizing a voltage applied from the power supply; an amplitude detection circuit for detecting a transmission signal input from the transmission line; a switching circuit for interrupting application of a voltage from the power supply stabilizing circuit to the transmission control circuit; and a control circuit for controlling the open/closed state of the switching circuit according to the presence or absence of a transmission signal detected by the amplitude detection circuit are provided, and only when the amplitude detection circuit has detected the transmission signal, the control circuit sets the switching circuit into the closed state so as to permit a voltage to be applied to the transmission control circuit. When no transmission signal is transmitted, application of an unnecessary voltage to the transmission control circuit is interrupted, thereby reducing the current consumption.

9 Claims, 5 Drawing Sheets

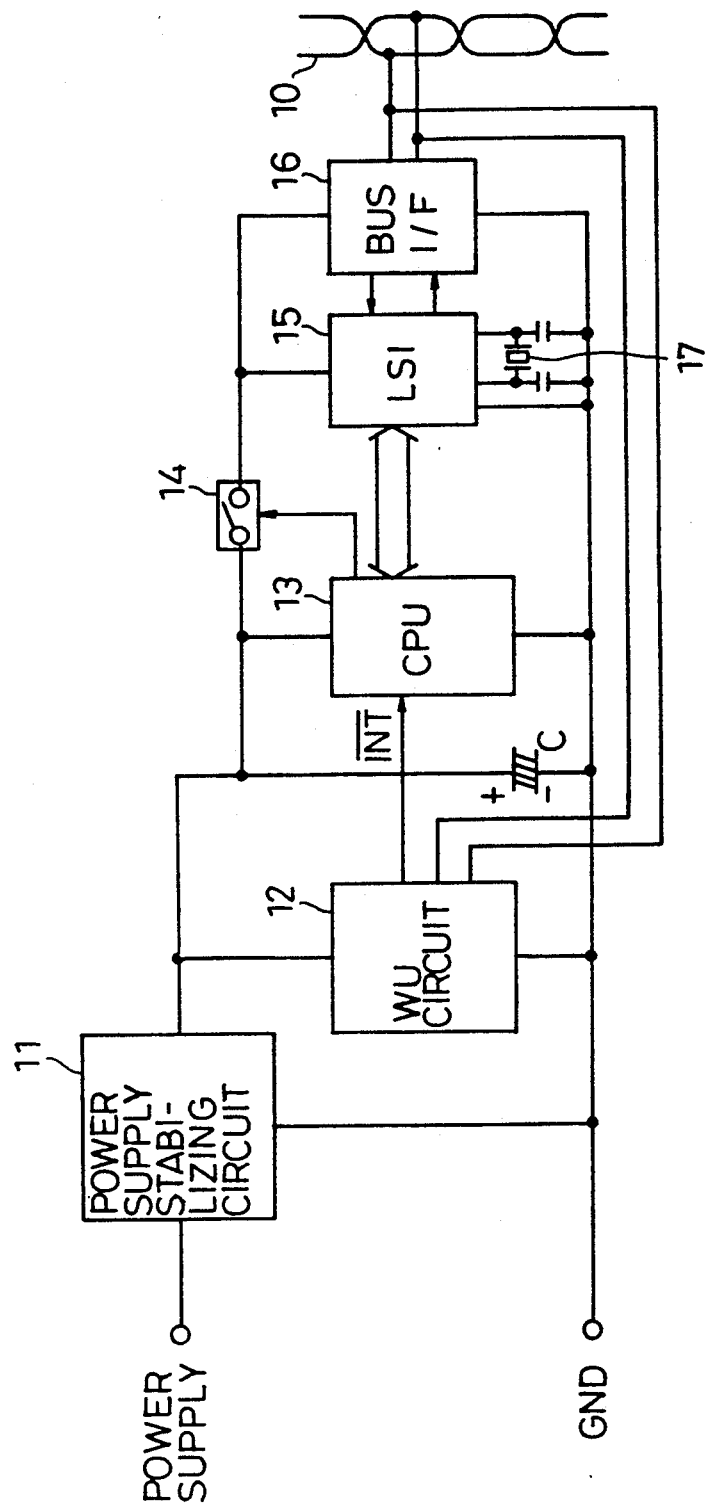
F I G. 1

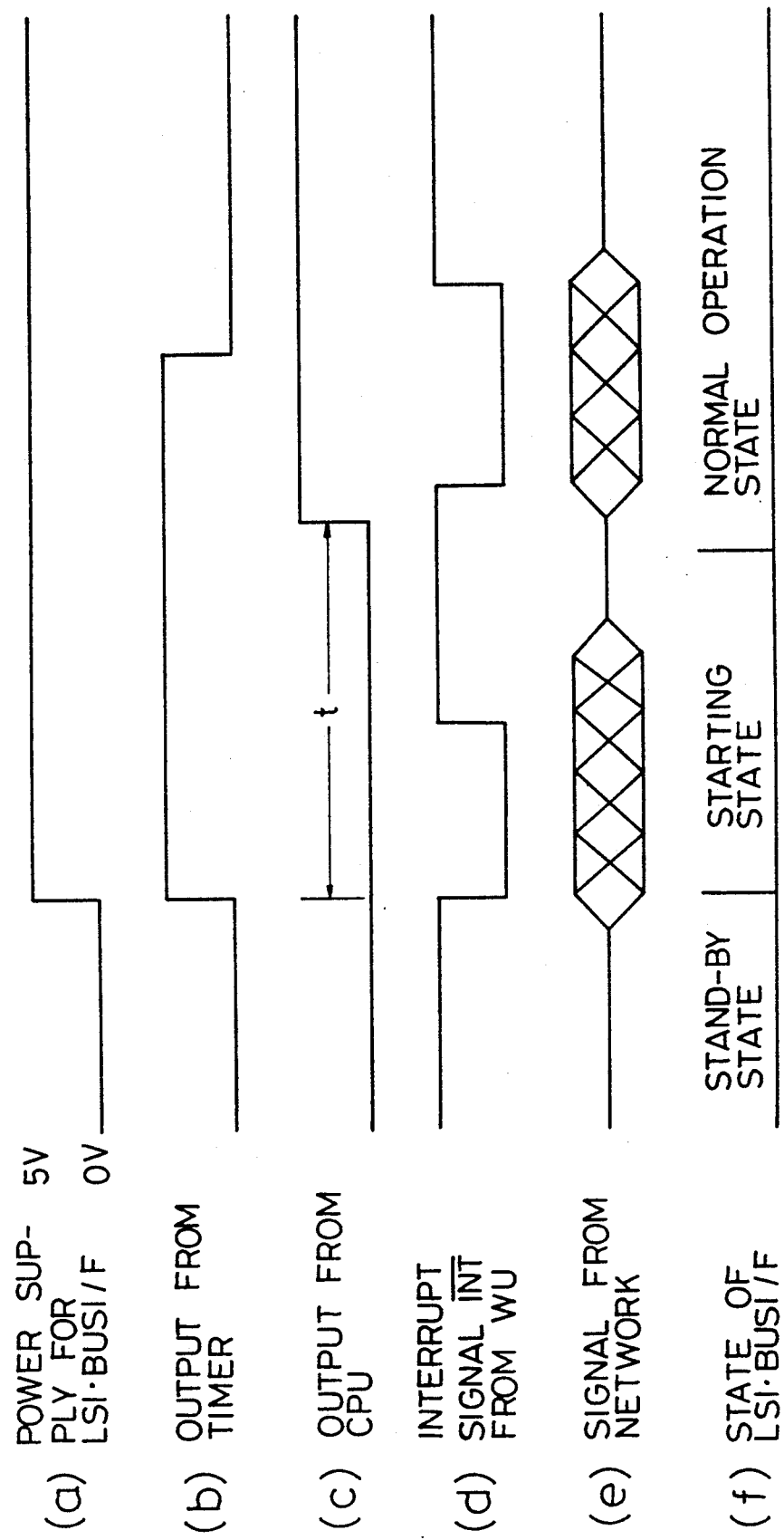

CURRENT CONSUMPTION CONTROL DEVICE

This application is a continuation of U.S. application Ser. No. 07/738,037, filed Jul. 30, 1991 now abandoned.

BACKGROUND OF THE INVENTION

1. Field of the Invention

This invention relates to a current consumption control device for suppressing consumption of current supplied from a power supply such as a battery in a car.

2. Description of the Related Art

Recently, the technique of electronically controlling the running system of a motorcar including an engine has been developed. For control of the running system and the like, data communication inside the car is effected by use of, for example, a LAN system or the like in which a plurality of nodes are connected to a network. In such a data communication system, the power supply is obtained from a battery. Therefore, in order to operate the communication system while the engine is stopped, it is desirable to suppress the current consumption of the battery while the network communication is not effected so as to set the current consumption as low as possible.

Conventionally, in this type of device, a voltage supplied from the power supply is stabilized by a power supply stabilizing device and then applied to a control circuit (which is hereinafter referred to as a CPU) and a transmission control circuit (which is hereinafter referred to as an LSI) for transmitting a transmission signal with respect to a transmission line (which is hereinafter referred to as a bus) under the control of the CPU. The CPU and LSI are set into the starting condition and initialized in response to application of the voltage so as to be ready for reception of a transmission signal from the bus.

An amplitude detection (which is hereinafter referred to as WU) circuit is started in response to application of a voltage from the power supply and detects transmission of a transmission signal from the bus connected thereto based on variation in the amplitude of the signal. When the transmission signal is detected, the power supply stabilizing device is controlled to be set into the operative state so that application of a voltage to the CPU and LSI becomes possible. Further, when transmission of the transmission signal is terminated, the WU circuit controls the power supply stabilizing device to set the same into a non-operative state and thus the current consumption of the battery is reduced by interrupting application of the voltage.

However, in the above current consumption control device, since an unstable voltage is applied to the WU circuit from the power supply, it is necessary to separately provide a stabilizing circuit for stabilizing the voltage. Further, it is necessary to connect a control device having a function of turning on/off the power supply voltage to the power supply stabilizing device. Therefore, with the above current consumption control device, the manufacturing cost will become high. Further, in general, since a capacitor having a large capacitance is inserted into a load of the stabilizing power supply, the rise time of the voltage becomes long. In addition, since the CPU is initialized, the rise time, that is, a period of time from the time that the signal is detected by the WU circuit until the CPU and LSI are correctly operated, will become long.

SUMMARY OF THE INVENTION

This invention has been made in view of the above problems and an object of this invention is to provide a current consumption control device which can reduce the time required for starting an LSI which transmits a transmission signal with respect to a transmission line when a voltage is applied to the LSI, and whose manufacturing cost can be reduced.

The above object can be attained by a current consumption control device of this invention comprises power supply stabilizing means for stabilizing a voltage applied from a power supply; detection means for detecting a transmission signal input from a transmission line; interruption means for interrupting application of a voltage from the power supply stabilizing means to transmission control means; and open/closed state control means for controlling the open/closed state of the interrupting means according to the presence or absence of a transmission signal detected by the detection means.

According to the above current consumption control device, the detection means is started by a voltage applied from the power supply stabilizing means, and when a signal transmitted from the transmission line is detected, the open/closed state control means sets the interruption means into the closed state so as to permit a voltage to be applied to the transmission control means so that an unnecessary voltage applied to the transmission control means will be interrupted when no transmission signal is transmitted and thus the current consumption can be reduced, the time for starting an LSI or the like can be reduced, a transmission signal can be rapidly transmitted and received, and the manufacturing cost can be lowered.

Preferably, the open/closed state control means of this invention may utilize a timer circuit for setting the interruption means into the closed state for a preset period of time if required. That is, the timer circuit sets the interruption means into the closed state for a period of time from the detection of a transmission signal until the open/closed state control means can control the interruption means to be set into the closed state.

According to the preferable arrangement, the time for the transmission control means to be set into a normal operation state in which the signal transmission and reception can be correctly effected can be further reduced and the reliability of the current consumption control device can be enhanced.

The objects, features and advantages of the present invention will become more apparent from a consideration of the detailed description of the invention when considered in conjunction with the accompanying drawings.

BRIEF DESCRIPTION OF THE DRAWINGS

FIG. 1 is a construction block diagram showing the schematic construction of a first embodiment of a current consumption control device according to this invention;

FIGS. 2(a)–3(d) are diagrams showing a timing of signals at respective portions of FIG. 1;

FIGS. 5(a)-5(b) are diagrams showing timing of signals at respective portions of FIG. 4.

DETAILED DESCRIPTION OF THE PREFERRED EMBODIMENTS

Figure 2:
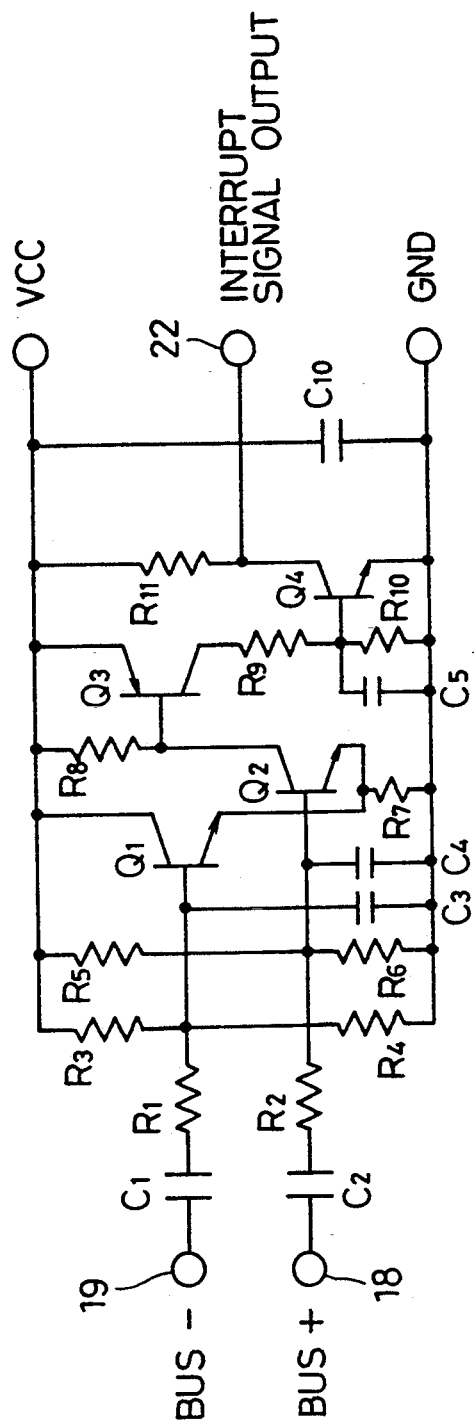
FIG. 2 is a circuit diagram showing an embodiment of an amplitude detection circuit shown in FIG. 1.

Referring to FIG. 1, a power supply stabilizing circuit 11 stabilizes a voltage supplied from a power supply to set the same to +5 V, for example, and applies the voltage to a WU circuit 12 and a CPU 13. Further, the power supply stabilizing circuit 11 applies the voltage supplied from the power supply to an LSI 15 and a bus interface (which is hereinafter referred to as a bus I/F) circuit 16 via a switching circuit 14. The CPU 13, LSI 15 and bus I/F circuit 16 are started or triggered in response to application of the above voltage and can make ready for reception of a transmission signal from a bus 10. The power supply stabilizing circuit 11, WU circuit 12, CPU 13, switching circuit 14, LSI 15 and bus I/F circuit 16 are included in nodes. The respective nodes transmit and receive a signal via the bus 10 and the nodes and the bus 10 constitute a network. Further, the power supply stabilizing circuit 11, WU circuit 12, CPU 13, LSI 15 and bus I/F circuit 16 are grounded and a reference voltage is set at 0 V.

FIG. 2 is a diagram showing the circuit construction of the WU circuit 12. The WU circuit 12 includes a differential amplifier circuit, comprising transistors $Q_1$ and $Q_2$. The differential amplifier circuit is connected to the bus 10 formed of twisted lines via a capacitor $C_1$, resistor $R_1$ and a capacitor $C_2$ and resistor $R_2$. The bus 10 constituting the network transmits transmission signals of positive and negative pulses to BUS+ and BUS− terminals 18 and 19, respectively, and if the above transmission signals are transmitted, the transistors $Q_1$ and $Q_2$ are respectively turned on and off. As a result, a base current flows into transistors $Q_3$ and $Q_4$ to turn on the transistors $Q_3$ and $Q_4$, thereby permitting an interrupt signal $\overline{INT}$ which is a negative pulse to be output from an interrupt output terminal 22 to the CPU 13. Since the WU circuit 12 is connected to the bus 10 via the capacitors $C_1$ and $C_2$, it can receive a signal even if one of the bus lines is fixed at the GND voltage, for example. Further, a circuit constituted by resistors $R_3$ to $R_6$ is a bias setting circuit for keeping the transistor $Q_1$ in the ON state when no signal is supplied.

When receiving the interrupt signal $\overline{INT}$, the CPU 13 controls the switching circuit 14 to set the same into the closed state (in this state, the power supply stabilizing device 11 is connected to the LSI 15 and bus I/F circuit 16). As a result, a voltage from the power supply stabilizing device 11 is applied to the LSI 15 and bus I/F circuit 16. The LSI 15 and bus I/F circuit 16 are started in response to the above voltage, and then they are set into the normal operation state after a preset period of time (in which the starting state is set and no transmission signal can be transmitted or received). The period of the above starting state is determined by the reset holding time of the LSI 15 and bus I/F circuit 16 and the oscillation stabilizing time of an oscillation circuit 17 connected to the LSI 15. Further, the CPU 13 checks whether the interval of the interrupt signal $\overline{INT}$ output from the WU circuit 14 in the reception operation is shorter than a preset period of time or not. If the interval is within the above preset period of time, the switching circuit 14 is kept in the closed state. Further, if the interrupt signal $\overline{INT}$ is not input after a preset period of time has elapsed, the switching circuit 14 is controlled to be set into the open state (in this state, the power supply stabilizing device 11 is disconnected from the LSI 15 and bus I/F circuit 16).

After this, when the LSI 15 and bus I/F circuit 16 are normally operated, the operation of receiving a transmission signal transmitted from the network can be effected.

Figure 3:
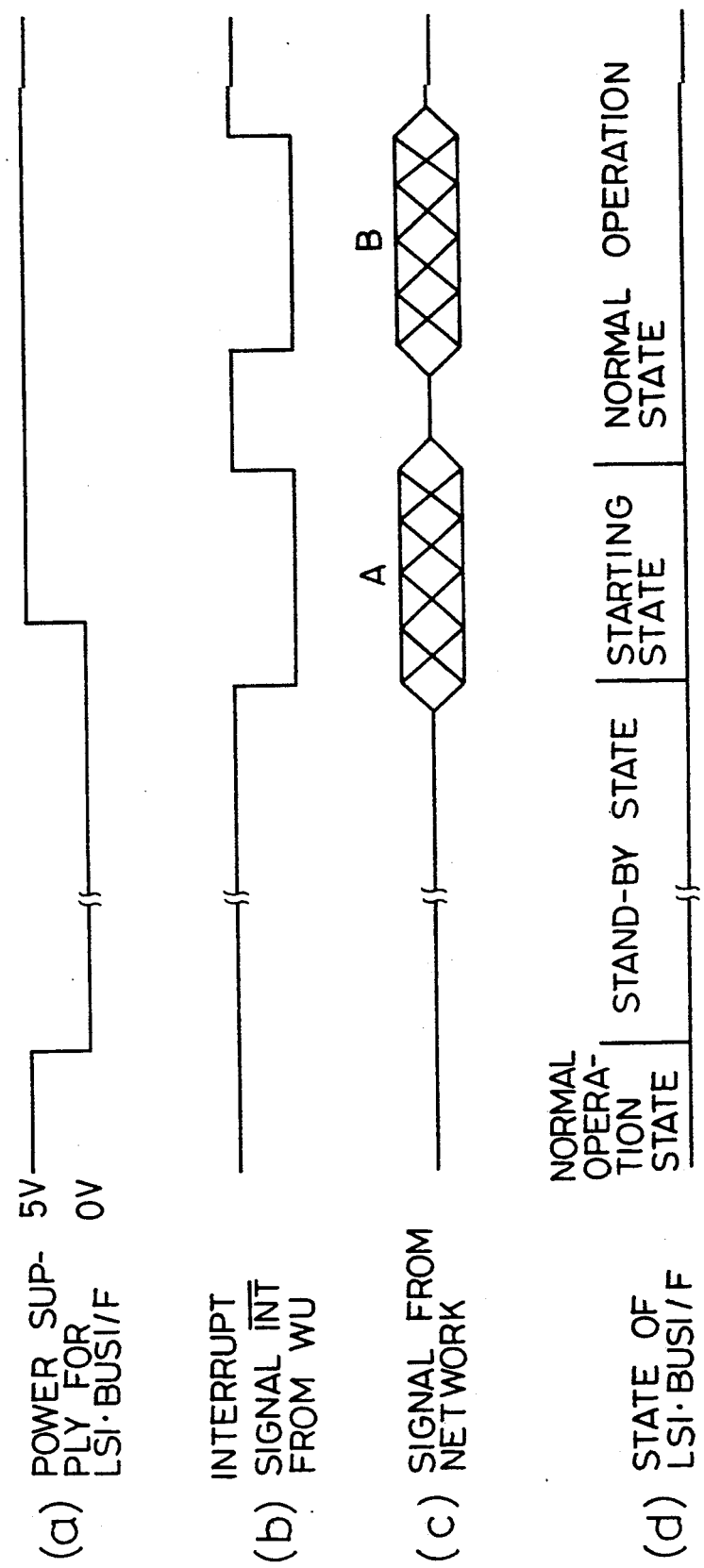

Next, the transition operation of the states of respective portions in the device of FIG. 1 is explained with reference to the timing chart of FIGS. 3(a)-3(d). In this embodiment, assume that the switching circuit 14 is set in the closed state under the control of the CPU 13 and a voltage of +5 V is applied from the power supply stabilizing device 11 to the LSI 15 and bus I/F circuit 16 as shown in FIG. 3(a) to set the LSI 15 and bus I/F circuit 16 in the normal operation state (refer to FIG. 3(d)). As shown in FIG. 3(c), no transmission signal is transmitted from the network, and as shown in FIG. 3(b), the WU circuit 12 is set in a state in which the interrupt signal $\overline{INT}$ is not transmitted.

First, the CPU 13 checks whether or not the interrupt signal INT from the WU circuit 12 is input within a preset period of time, and if there is no input, the switching circuit 14 is controlled to be set into the open state. As a result, no voltage is applied from the power supply stabilizing device 11 to the LSI 15 and bus I/F circuit 16 (refer to FIG. 3(a)) and the LSI 15 and bus I/F circuit 16 are set into the stand-by state.

Next, if the WU circuit 12 has detected a transmission signal A (refer to FIG. 3(c)) transmitted from the network, the WU circuit 12 outputs the interrupt signal $\overline{INT}$ (refer to FIG. 3(b)) to the CPU 13. When receiving the interrupt signal $\overline{INT}$, the CPU 13 sets the switching circuit 14 into the closed state so as to permit a voltage from the power supply stabilizing device 11 to be applied to the LSI 15 and bus I/F circuit 16. As a result, the LSI 15 and bus I/F circuit 16 are set into the starting state, and after a preset period of time, they are set into the normal operation state in which they can transmit or receive a transmission signal with respect to the network, and thus, they can receive a transmission signal B.

As described above, according to the current consumption control device of this invention, if no transmission signal is transmitted or received for more than a preset period of time, the power supply for the LSI and bus I/F circuit whose power consumption is large is interrupted by use of the switching circuit and a voltage is applied only to the power supply stabilizing device, WU circuit and CPU so that the current consumption of the battery can be reduced. Further, according to the current consumption control device of this invention, since a stabilized voltage is applied from the power supply stabilizing device to the WU circuit, it is not necessary to additionally provide a stabilizing circuit and provide a control device having an ON/OFF function for the power supply voltage in the power supply stabilizing device so that the manufacturing cost can be lowered. Further, according to the current consumption control device of this invention, since the power supply stabilizing device and the CPU are always set in the operative state even when the LSI and bus I/F circuit are set in the stand-by state, the period of the starting state thereof can be set to a short period of time such as the reset holding time or the oscillation stabilizing time of the oscillation circuit. As a result, the time that the LSI and bus I/F circuit are set into the normal operation state in which a signal can be correctly transmitted or received can be reduced.

Figure 4:
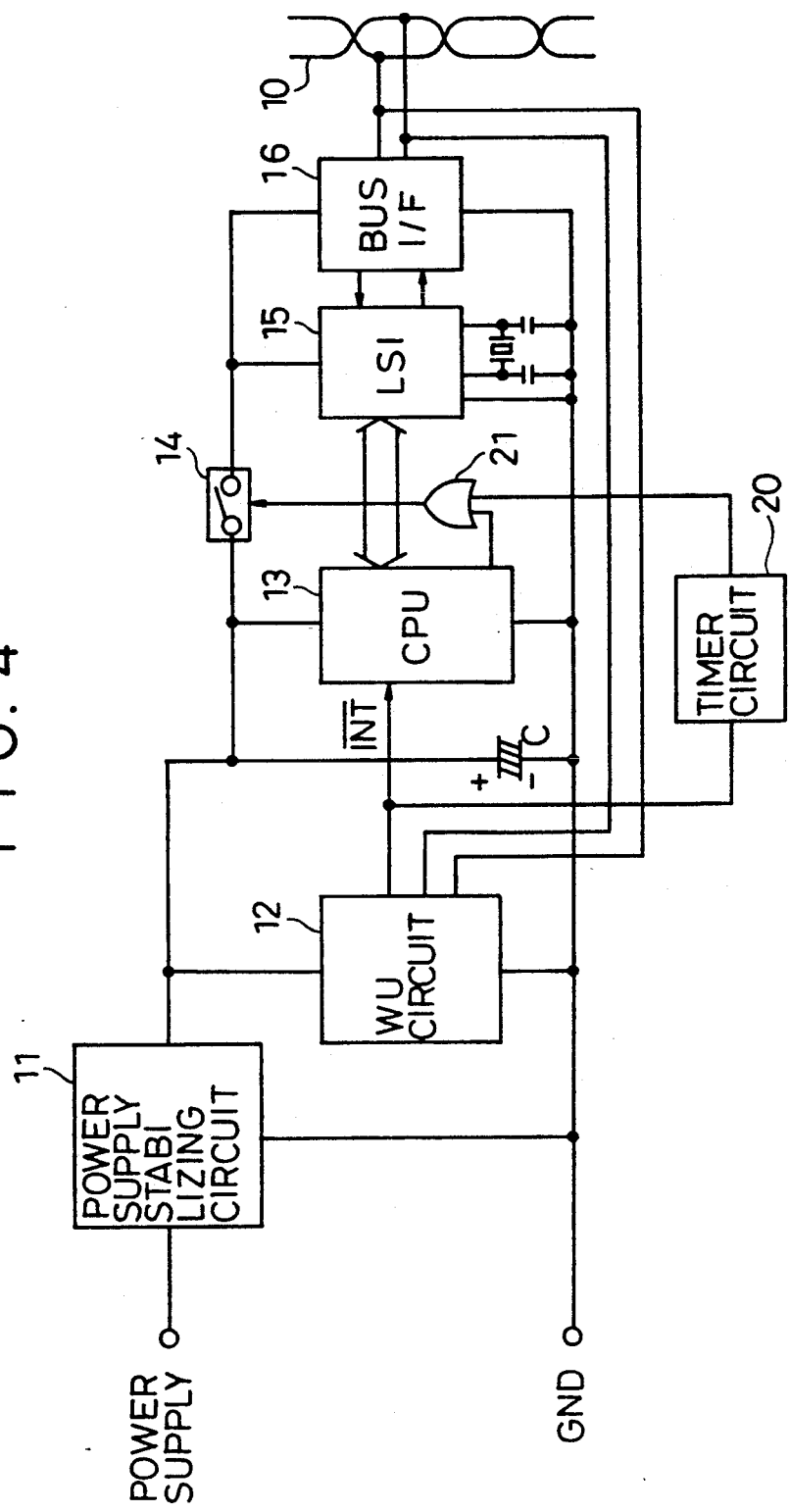
FIG. 4 is a construction block diagram showing the schematic construction of a second embodiment of a current consumption control device according to this invention.

This invention is not limited to the current consumption control device of the above embodiment. FIGS. 4 and 5(a)-5(b) are a block diagram and a timing chart showing a second embodiment of this invention. In this embodiment, portions which are the same as those of FIG. 1 are denoted by the same reference numerals, the explanation thereof is omitted, and only portions having different functions are explained.

In general, there is a possibility that a period from the time that the CPU 13 is interrupted by the interrupt signal $\overline{INT}$ until the CPU 13 controls and sets the switching circuit 14 into the closed state in response to the above interruption is long, for example, the oscillation circuit of the CPU 13 is started after the CPU 13 has detected the interruption. In this case, the LSI 15 and bus I/F circuit 16 are started with time delay and the transmission and reception of the transmission signal may be delayed. Referring to FIG. 4, in the second embodiment, the interrupt signal $\overline{INT}$ from the WU circuit 12 is supplied not only to the CPU 13 but also to a timer circuit 20. In the second embodiment, the switching circuit 14 is held in the closed state by the timer circuit 20 for a period of time longer than time t (refer to FIG. 5(c)) in which the CPU 13 can set the switching circuit 14 into the closed state.

That is, when a transmission signal is transmitted from the network (refer to FIG. 5(e)), the WU circuit 12 detects the transmission signal and outputs an interrupt signal $\overline{INT}$ to the CPU 13 and timer circuit 20 (refer to FIG. 5(d)). When receiving an interrupt signal $\overline{INT}$, the timer circuit 20 outputs an output signal (refer to FIG. 5(b)) for setting the switching circuit 14 into the closed state to the switching circuit 14 via an OR circuit 21 and holds the switching circuit 14 in the closed state for a preset period of time (FIG. 5(b)).

Thus, a voltage from the power supply stabilizing device 11 is applied to the LSI 15 and bus I/F circuit 16 (refer to FIG. 5(a)) so as to set the LSI 15 and bus I/F circuit 16 from the stand-by state to the starting state (refer to FIG. 5(f)). Then, the LSI 15 and bus I/F circuit 16 are set into the normal operation state after a preset period of time and thus make ready for the transmission and reception of a transmission signal with respect to the network.

As described above, according to the current consumption control device of this invention, a voltage from the power supply is applied to the LSI circuit and bus I/F circuit by means of the timer circuit in a period from the time that the interrupt signal is output from the WU circuit until the CPU sets the switching circuit into the closed state. As a result, in the current consumption control device of this invention, a time for the LSI and bus I/F circuit to be set into the normal operation state in which they can correctly transmit and receive a transmission signal can be reduced.

What is claimed is:

1. A device for controlling the current consumption of a power supply, comprising:

power supply stabilizing means for stabilizing a voltage generated by said power supply and for producing a stabilized voltage;

transmission control means for transmitting a data transmission signal on a transmission line, said transmission control means being selectively powered by the stabilized voltage;

interface means for connecting said transmission control means and said transmission line, said interface means being selectively powered by the stabilized voltage;

detection means for detecting the data transmission signal on said transmission line and for outputting a detection signal when the data transmission signal is detected, said detection means being supplied with and powered by the stabilized voltage;

openable and closeable interrupting means for supplying the stabilized voltage from the power supply stabilizing means to said transmission control means and to said interface means when said interrupting means is in closed state, and for interrupting supply of the stabilized voltage from the power supply stabilizing means to said transmission control means and to said interface means when said interrupting means is in an open state; and a central processing unit for controlling the opening and closing of said interrupting means in accordance with the detection signal output by said detection means.

2. The device according to claim 1, wherein said central processing unit is supplied with and powered by the stabilized voltage produced by said power supply stabilizing means.

3. The device according to claim 1, wherein said detection means and said central processing unit are continuously supplied with and powered by the stabilized voltage produced by said power supply stabilizing means.

4. The device according to claim 1, wherein said central processing unit controls said interrupting means to be set in the open state when said detection means detects that no transmission signal is being transmitted, and wherein said central processing unit controls said interrupting means to be set in the closed state when said detection means detects that the transmission signal is being transmitted.

5. The device according to claim 1, wherein said central processing unit includes means for receiving the detection signal output by said detection means, and controls said interrupting means to be set in the closed state when the detection signal is received.

6. The device according to claim 1, wherein said interrupting means includes a switching circuit means for selectively making or breaking a connection between said power supply stabilizing means and said transmission control means, and for selectively making or breaking a connection between said power supply stabilizing means and said interface means.

7. The device according to claim 1, further comprising a timer circuit means for keeping said interrupting means in the closed state for a preset period of time.

8. The device according to claim 7, wherein said timer circuit means keeps said interrupting means in the closed state until said central processing unit controls said interrupting means to be set in the open state.

9. The device according to claim 1, wherein said central processing unit further receives the transmission signal and carries out a predetermined function control on the basis of the transmission signal, said central processing unit being supplied with and powered by the stabilized voltage.

* * * * *